(12) United States Patent
Hoellt et al.

(10) Patent No.: US 10,106,102 B2
(45) Date of Patent: Oct. 23, 2018

(54) CAMERA ASSEMBLY FOR A VEHICLE, AND VEHICLE HAVING SUCH A CAMERA ASSEMBLY

(71) Applicant: Robert Bosch GmbH, Stuttgart (DE)

(72) Inventors: Christian Hoellt, Schoeneck (DE); Nikolai Bauer, Moeglingen (DE); Ulrich Seger, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 171 days.

(21) Appl. No.: 14/779,249

(22) PCT Filed: Feb. 24, 2014

(86) PCT No.: PCT/EP2014/053503
§ 371 (c)(1),
(2) Date: Sep. 22, 2015

(87) PCT Pub. No.: WO2014/146865
PCT Pub. Date: Sep. 25, 2014

(65) Prior Publication Data
US 2016/0144797 A1    May 26, 2016

(30) Foreign Application Priority Data

Mar. 22, 2013   (DE) .................. 10 2013 205 165

(51) Int. Cl.
*B60R 11/04*    (2006.01)
*H04N 5/225*    (2006.01)
(Continued)

(52) U.S. Cl.
CPC ........... *B60R 11/04* (2013.01); *H04N 5/2251* (2013.01); *H04N 5/2252* (2013.01);
(Continued)

(58) Field of Classification Search
CPC .. H04N 5/2251; H04N 5/2252; H04N 5/2253; H04N 5/2257; H04N 5/247; B60R 11/04; B60R 2011/0026
See application file for complete search history.

(56) References Cited

U.S. PATENT DOCUMENTS 7,122,784 B2 * 10/2006 Peterson ............... B60S 1/0822
                                                    250/227.25
9,090,213 B2 *  7/2015 Lawlor ................... B60R 1/12
(Continued)

FOREIGN PATENT DOCUMENTS

DE    102006059555    6/2008
DE    102009019216    1/2010
(Continued)

OTHER PUBLICATIONS

International Search Report for PCT/EP2014/053503, dated May 26, 2014.

*Primary Examiner* — Lin Ye
*Assistant Examiner* — Chriss Yoder, III
(74) *Attorney, Agent, or Firm* — Norton Rose Fulbright US LLP; Gerard Messina

(57) ABSTRACT

A camera assembly is provided for a vehicle, the camera assembly at least having: a camera having a camera optics and an image sensor, an optical coupling body including a contact face for engaging on an inner surface of a vehicle window pane; the optical coupling body being formed of an optically transparent material and being configured in an area of coverage by the camera; a fixing device being provided between the camera and the optical coupling body for positioning the coupling body relative to the camera.

17 Claims, 4 Drawing Sheets

(51) Int. Cl.
*H04N 5/247* (2006.01)
*B60R 11/00* (2006.01)

(52) U.S. Cl.
CPC ........... *H04N 5/2253* (2013.01); *H04N 5/247* (2013.01); *B60R 2011/0026* (2013.01); *H04N 5/2257* (2013.01)

(56) References Cited

U.S. PATENT DOCUMENTS

| | | | |
|---|---|---|---|
| 9,440,535 B2 * | 9/2016 | Schofield | B60Q 1/1423 |
| 2009/0085755 A1 * | 4/2009 | Schafer | B60R 11/04 340/602 |
| 2009/0128629 A1 * | 5/2009 | Egbert | B60R 1/00 348/148 |
| 2012/0026330 A1 * | 2/2012 | Huelsen | B60R 1/00 348/148 |

FOREIGN PATENT DOCUMENTS

| | | |
|---|---|---|
| EP | 2189340 | 5/2010 |
| WO | WO03/074333 | 9/2003 |
| WO | WO03/074964 | 9/2003 |
| WO | WO2004/020250 | 3/2004 |
| WO | WO2010/076065 | 7/2010 |
| WO | WO2010/121982 | 10/2010 |
| WO | WO2012/098192 | 7/2012 |

* cited by examiner

CAMERA ASSEMBLY FOR A VEHICLE, AND VEHICLE HAVING SUCH A CAMERA ASSEMBLY

FIELD OF THE INVENTION

The present invention relates to a camera assembly for a vehicle that can be installed, in particular, in a passenger compartment of a vehicle, and to a vehicle of this type.

BACKGROUND INFORMATION

Camera assemblies of this type are used, in particular, for capturing a vehicular environment, for example, for driver assistance systems. The camera assembly includes a camera that is adhesively bonded, for example, via a camera mount to an inner side of the vehicle window pane, in particular of a windshield of the vehicle, or, for example, also fastened to a rearview mirror or to the ceiling of the vehicle. It is also known to use the camera to perform additional secondary functions, for example, to detect objects on the vehicle window pane, in particular to detect raindrops.

Light in the visible spectral region can be used to sense the vehicular environment, for example, particularly other road users and road signs as well; light in the infrared region, i.e., IR radiation, can also be used in night vision systems.

Published International Patent Application No. WO 2010/76065 describes a camera system, which, as a primary image, produces an image of a vehicular environment, and, as a secondary image, captures an area of an outer surface of the vehicle window pane. To record the secondary image, a first mirror is configured in a lower portion of the area of coverage, and another mirror is provided above the objective lens. Thus, the objective lens uses two deflecting mirrors to sense a coating that adheres to the outer side of the window pane essentially above the objective lens. Accordingly, such a system requires adequate installation space, respectively space for mounting the deflection mirrors.

However, auxiliary optics designs for cameras that include mirrors, for example, as discussed in Published International Patent Application No. WO 2010/76065 are relatively expensive. They require additional optical means, as well as appropriate positioning and alignment of the camera relative to the vehicle window pane.

Published International Patent Application No. WO 2012/098192 discusses mounting a prism on an inner surface of the vehicle window pane, the prism forming an optical coupling body. In this case, the design of the prismatic coupling body is such that the phenomenon of a wavelength-selective beam broadening caused by dispersion by the prism on the imager module does not occur since the beam broadening is below the resolution of the image sensor. Thus, the light propagates from the vehicular environment through the vehicle window pane, through the optical coupling body disposed on the inner surface of the vehicle window pane, to the camera optics, and onto the image sensor.

However, the relative position between the coupling body and the camera is generally not clearly defined when the coupling body is attached in this manner, so that there is the risk of a misadjustment.

Published International Patent Application Nos. WO 03/074333 and WO 03/074964 describe using additional holding means or fixing means for imperviously fastening a camera to the windshield, for example, tubular objects adhesively bonded to the inner surface. Therefore, they stop scattered light and prevent a dirt accumulation or a condensation on the windshield in the relevant area.

Generally, therefore, the outlay for equipment for such imaging systems and for the optical adjustment thereof is relatively substantial. In the case of a rain sensor system, for example, a mirror mounted underneath the area of coverage is usually provided to sense a vehicular environment. It deflects the beam path toward the sky. This has a negative effect on the optical imaging properties and the rain sensor system over the course of a day, particularly if there is considerable brightness due to solar irradiation, for example. Furthermore, the optical imaging path of such systems is relatively short, so that partial degradation of the optical properties can occur.

These types of camera systems also require an unobstructed view through the vehicle window pane, for example, near the ceiling. When a camera assembly of this kind is mounted in an upper portion of the vehicle window pane, in particular of the windshield, it is also necessary in conformance therewith to reserve space for an optionally provided black tinting or other type of darkening. To some extent, the free space required for this is considerable, especially because of the slant of the vehicle window pane. Thus, there can be a shortage of space if additional functions are located in this area.

SUMMARY

The present invention provides for a fixing device to ensure a positioning of a camera relative to an optical coupling body mounted on an inner surface of a vehicle window pane.

The advantage is already hereby attained of ensuring an efficient optical imaging and a most accurate possible relative positioning.

The optical coupling body is preferably disposed in a region between an optics of the camera and a vehicular environment; thus, light in the visible region or IR region of the vehicular environment, for example, is imaged through the vehicle window pane, the optical coupling body, as well as the camera optics, onto the image sensor. The optical coupling body is designed in one piece, in particular, i.e., provided as one single component and is positionable on the vehicle window pane.

In accordance with an embodiment, the coupling body may be made of a homogeneous material; the advantage of an inexpensive design is hereby attained, for example, as a molded part, for instance of a soft, optically transparent material, such as a silicone material.

In accordance with another specific embodiment, a multilayered construction is possible, for example, including an outer layer of a softer material, for example, i.e., having a lower Shore hardness, in particular a transparent silicone material, that is provided for engagement on the inner surface of the vehicle window pane, along with an adjoining harder, respectively more inherently rigid inner layer, for example, a glass plate of a mineral glass or plastic glass.

Further advantages are derived from this multipart construction: the harder inner layer makes possible a high inherent rigidity; and the contact pressure of the outer soft layer is evened out, making it possible to substantially prevent an inclusion of air zones between the outer, soft layer and the vehicle window pane.

In accordance with a specific embodiment, the optical coupling body has a first coupling body region that essentially has a biplanar form, i.e., the first coupling body region has a contact face used as a first input surface for the light for engagement on the inner surface of the vehicle window pane, and a first exit surface. These two surfaces essentially extend mutually in parallel; a slight nonparallelism may optionally exist in the case of a prismatic formation when the hereby induced wavelength-dispersive spreading of the light is below the resolution of the image sensor, for example. Thus, the first coupling body region may be formed by a one-piece homogeneous material, or, for example, also by the outer and inner layer mentioned above.

An advantage of the optical coupling body resides in that an optical path length from the camera optics to the vehicle window pane may be hereby reduced. The optical coupling body may have an optical density, respectively a refractive index in the area of the vehicle window pane. Thus, the beam path propagates obliquely to the vehicle window pane from the camera optics along the optical axis across a shorter region; the result is that the area of coverage sensed through the vehicle window pane may be configured to have a shorter lateral extent. Thus, the area of coverage for capturing the vehicle's surroundings requires a smaller passage region through the vehicle window pane. Thus, for example, a black tinting or any other darkening of the vehicle window pane may extend over a larger region; space reserved as an optical free space for sensing the vehicular environment may, therefore, be configured to have a shorter lateral extent in this darkened region on the vehicle window pane, rendering the reserved space not optically noticeable.

For additional functionality, the optical coupling body may also have a second coupling body region including a second entrance surface and a second exit surface for the light, i.e., for light in the optical region or also IR radiation, for example. Thus, the second entrance surface and the second exit surface are not merely continuations of the first entrance surface and the first exit surface of the coupling body region; in particular, the second entrance surface is not parallel to the first entrance surface. Together, the second entrance surface and the second exit surface may form a prism, for example, respectively be slightly inclined toward each other, for example, be tapered away from the vehicle window pane. Thus, the second exit surface may be disposed at a larger angle relative to the first exit surface, for example, about 90°, or, for example, within a range of between 30° and 120°.

Further advantages are thereby derived:

A high functionality may be ensured by one single optical coupling body; a first imaging system constituted of camera optics and a first coupling body region may be produced for capturing a vehicular environment, such as a road area in front of the vehicle, for example, at a far object distance, even at an object distance of infinity, for example. Furthermore, the camera optics and the second coupling body region may form a second imaging system used for a rain sensor system, for example, i.e., for a shorter object-distance functionality. An outer surface of the vehicle window pane may be imaged here, for example, or an object on the outer surface of the vehicle window pane, i.e., at a close object distance in front of the outer surface of the vehicle window pane.

Further advantages of the imaging properties are derived in the case of a lateral contouring of the second entrance surface and/or of the second exit surface.

Different fixing device designs are additionally possible, both in the case of a coupling body having merely a first coupling body region and an essentially biplanar configuration, as well as in the case of a coupling body design having a first and a second coupling body region. The fixing device may be used here for fixing the optical coupling body in position, the optical coupling body being form-fittingly accommodated by the fixing device, in particular.

The advantage is hereby derived that the optical coupling body may be mounted without adhesive to the inner surface of the vehicle window pane by fastening the fixing device, together with the form-fittingly accommodated coupling body, to the inner surface of the vehicle window pane, so that the coupling body is fixedly, respectively form-lockingly provided or clamped between the inner surface and the fixing device, ensuring that it cannot fall inwardly, for example. To this end, the fixing device may embrace the coupling body at the lateral ends thereof, for example. Here the advantage is derived that no adhesive residues are able to influence the optical properties of the coupling body.

In accordance with a specific embodiment, a further advantage is derived when the fixing device is also used for receiving the entire camera, for example, by the camera housing thereof. Thus, the camera may be received by the fixing device used as a camera mount and be attached in the vehicle, for example, by adhesively bonding the fixing device to the vehicle window pane. This eliminates the need for additional means, such as a camera mount, etc.

A further advantage is derived when the camera is mounted in the fixing device by insertion of the camera optics, respectively of the objective lens in a corresponding mount of the fixing device. Thus, the camera optics may be sealed in the recess of the fixing device, for example, by a ring seal. A precise relative positioning of the camera optics and of the image sensor is, therefore, ensured, i.e., in particular, of an imager module composed of a carrier device, a camera optics and an image sensor, relative to the vehicle window pane and the coupling body. A high degree of imperviousness is thereby achieved.

Instead of this type of ring seal on the mount, the camera optics may also be axially pressed against a soft coupling element that acts as a seal and is configured on the mount, i.e., a sealing action is effected by pressing the camera optics along the optical axis against the soft coupling element.

These seals, i.e., the ring seal or axial seal, provide the advantage that the fixing device makes possible a sealing action for the intermediate space between the camera optics, the fixing device and the coupling body, making it possible to prevent dirt accumulation in or the degradation of the intermediate space between the coupling body and the camera optics. This also makes it possible to largely prevent any dirt from accumulating, for example, on an outer surface of the lens of the camera optics. An inert gas may also be introduced into the intermediate space, for example. The intermediate space may also communicate with a passenger compartment, for example, also via a permeable membrane or the like, to permit a pressure compensation in the case of temperature fluctuations. A desiccant may also be provided, for example, in the intermediate space to dry the same, respectively to maintain a constant relative humidity.

The fixing device may advantageously initially receive the coupling body; the fixing device may be subsequently adhesively bonded to the inner surface of the vehicle window pane; and the camera then mounted or inserted into the fixing device, thereby simultaneously achieving a sealing action.

The advantage is already hereby attained of making possible a simple, rapid and secure attachment of the entire camera assembly. Furthermore, a precise positioning of the camera, in particular of the entire system composed of camera optics and an image sensor, is ensured relative to the window pane and the optical coupling body. This also makes possible a flexible design since different cameras may be positioned simply and reliably relative to the coupling body using the fixing device. Thus, different cameras may be mounted on different types of vehicles having different windshield shapes or a darkened portion (black tinting).

DETAILED DESCRIPTION

Figure 1:
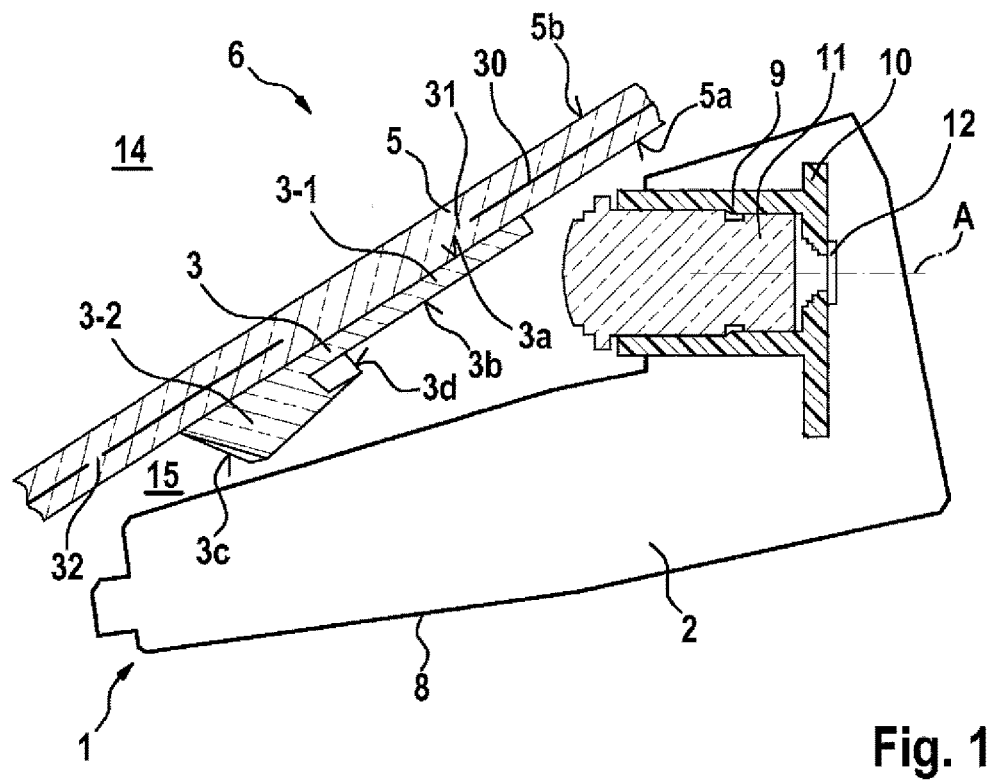
FIG. 1 shows a camera assembly in accordance with a specific embodiment on a vehicle window pane.
Figure 2:
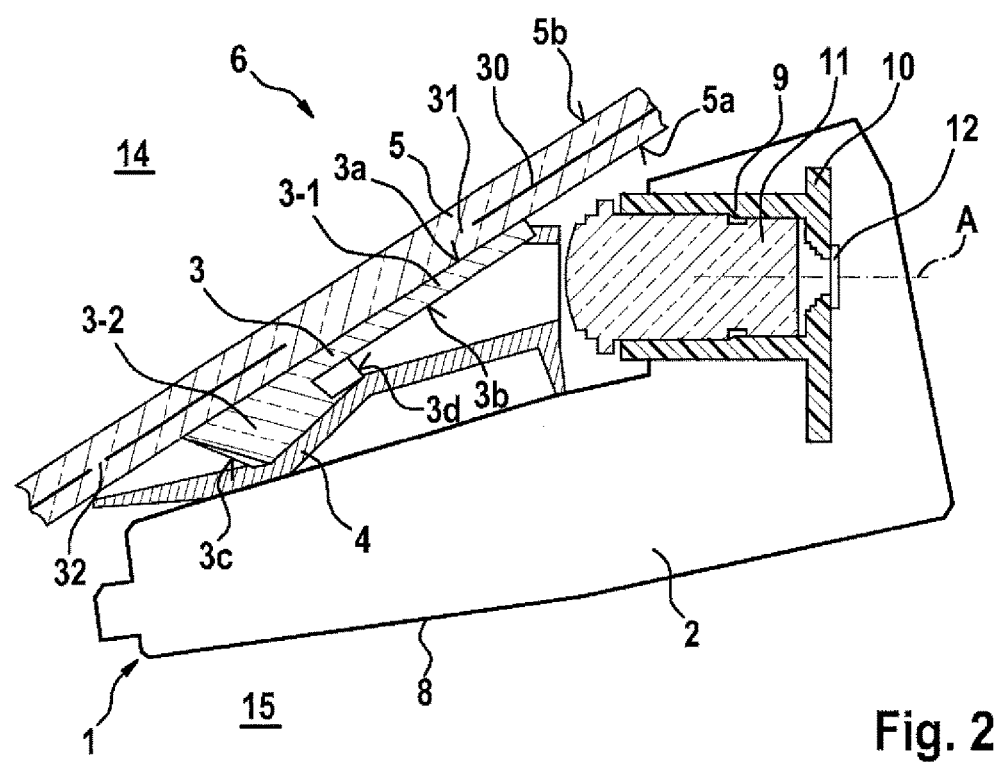
FIG. 2 shows a corresponding illustration including a fixing device in accordance with a specific embodiment.

A camera assembly 1 shown in FIGS. 1 and 2 includes a camera 2, an optical coupling body 3, and a fixing device 4 that is provided between camera 2 and optical coupling body 3 and is readily apparent, in particular, from FIG. 2. Optical coupling body 3 is mounted to an inner surface 5a of vehicle window pane 5; thus, optical coupling body 3 rests by a contact face 3a flat against inner surface 5a of vehicle window pane 5 of a vehicle 6.

Camera 2 has a camera housing 8 and an imager module 9, as well as other components (not shown here), such as a circuit substrate plate, a data connection for the data circuit in vehicle 6 and, optionally, other electrical components. Imager module 9 essentially features a carrier device 10, a camera optics 11, i.e., an objective lens, for example, that, in particular, may also have a plurality of individual lenses, and an image sensor 12 mounted on carrier device 10. In the illustrated embodiment, carrier device 10 is in one piece; thus, on the one hand, it accommodates image sensor 12 and, in addition, is used as a camera mount for camera optics 11; in general, however, multipart embodiments are also possible where image sensor 12 is attached to a first part of carrier device 10, which, in turn, has a separate camera mount.

Image sensor 12 and camera optics 11 define an optical axis A that is directed through optical coupling body 3 and vehicle window pane 5 at a vehicular environment 14. Thus, camera assembly 1, configured within a passenger compartment 15, captures, in particular, a vehicular environment 14 outside of vehicle 6.

Fixing device 4 in accordance with FIG. 2 is used for positioning camera 2 relative to optical coupling body 3; in addition, fixing device 4 may also be used for positioning camera 2 relative to vehicle window pane 5. Fixing device 4 may already be used as a camera mount for securing camera 2 and optical coupling body 3 in vehicle 6, for example, to vehicle window pane 5; furthermore, an additional camera mount (not shown here) for mechanically positioning and securing camera 2, in particular, may be provided. In the specific embodiment of FIG. 2, fixing device 4 is braced against camera housing 8, for example; in the further specific embodiment described with reference to FIG. 6, a relative positioning may take place between camera optics 11 and vehicle window pane 5 and/or optical coupling body 3. Fixing device 4 may, in particular, be designed as a plastic part, for example, a plastic injection molded part.

Figure 3:
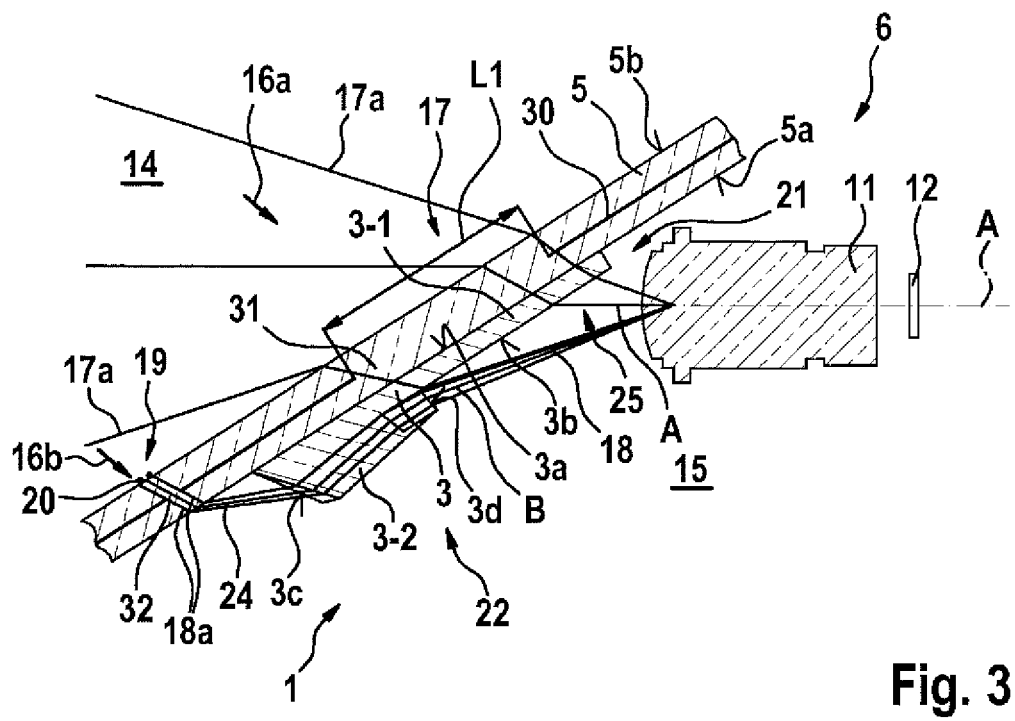
FIG. 3 shows an illustration of the optical beam path in accordance with the specific embodiment of FIGS. 1 and 2.
Figure 4:
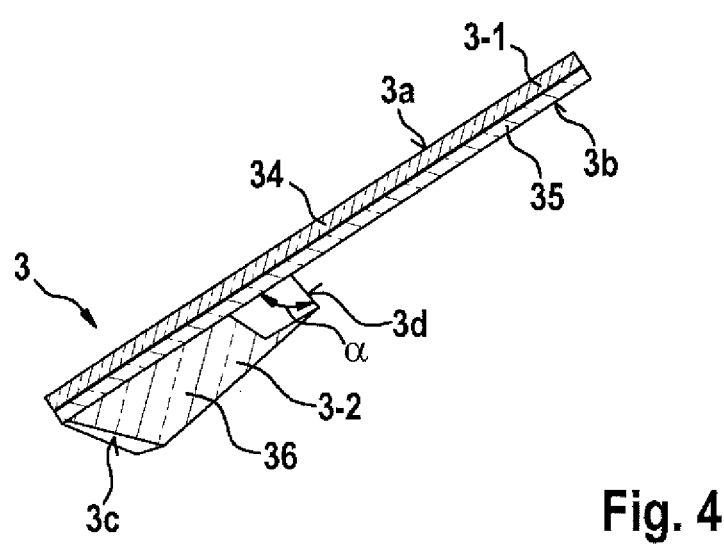
FIG. 4 shows an optical coupling body in accordance with another specific embodiment having a multilayered structure.

The specific embodiments of FIG. 1 through 4 show an optical coupling body 3 that has a first coupling body region 3-1 through which optical axis A extends, as well as a second coupling body region 3-2 that is disposed underneath first coupling body region 3-1 and is joined thereto. In accordance with the specific embodiment of FIG. 1 through 3, entire optical coupling body 3 is formed from a transparent material, for example, as a molded part to be homogeneously transmissive to the relevant wavelength region, for example, visible light or IR radiation; FIG. 4 shows a multilayered structure.

First coupling body region 3-1 is advantageously configured to be substantially biplanar, i.e., contact face 3a thereof adjoining inner surface 5a of vehicle window pane 5 extends essentially parallel to first exit surface 3b thereof that is disposed toward passenger compartment 15 and faces camera optics 11. Contact face 3a essentially conforms to the shape of inner surface 5a of vehicle window pane 5, i.e., is essentially planar; first exit surface 3b thus assumes a corresponding surface profile.

Thus, camera 2 picks up light (radiation) 16a, for example, in the optical region or also in the IR region, coming from vehicular environment 14, through vehicle window pane 5, first coupling body region 3-1 of optical coupling body 3, and a line section 25 in passenger compartment 15. Contact face 3a of first coupling body region 3-1, therefore, serves as the first entrance surface (light entrance surface) in the optical beam path for sensing vehicular environment 14. Thus, together with camera optics 11, first coupling body region 3-1 forms a first imaging system 21 that images a first area of coverage 17 that is bounded by marginal rays 17a.

Second coupling body region 3-2 has a second entrance surface 3c and a second exit surface 3d; second entrance surface 3c not extending parallel to inner surface 5a and thus not to contact face 3a of first coupling body region 3-1 serving as first entrance surface; furthermore, second exit surface 3d does not extend parallel to first exit surface 3b and thus also not to inner surface 5a of vehicle window pane 5. An angle α, which is readily apparent from FIG. 4 between first exit surface 3b and second exit surface 3d, is advantageously approximately 90°; angle α, may be within a range of between 30° and 120°, for example.

Thus, together with camera optics 11, second coupling body region 3-2 forms another, second imaging system 22 that is used here for imaging a window pane environment 19, as illustrated in FIG. 3, for example, that, in particular, may be defined by an outer surface 5b of vehicle window pane 5 or may also be disposed somewhat outside of outer surface 5b of vehicle window pane 5. Window pane environment 19 may, in particular, be defined by objects 20 that adhere to outer surface 5b, in particular water droplets or raindrops, as the case may be, also frost or accumulated dirt. Thus, second imaging system 22, constituted of camera optics 11 and second coupling body region 3-2, may be used for detecting dirt accumulated on a window pane, in particular also as a rain sensor system, to image objects 20, such as raindrops and accumulated dirt, for example, onto image sensor 12.

Thus, an object 20 irradiated by light 16b is imaged on outer surface 5b of vehicle window pane 5, first through vehicle window pane 5; then in a beam path 24 to second entrance surface 3c; from there, into second coupling body region 3-2 where it is refracted; and to second exit surface 3d and, from there, to camera optics 11. Thus, a first area of coverage 17, which serves for imaging vehicular environment 14, and a second area of coverage 18, which adjoins the same downwardly, away from optical axis A and which is bounded by marginal rays 18a, are formed, areas of coverage 17 and 18 advantageously adjoining one another as a solid angle region. An imaging axis B, which, therefore, defines second imaging system 22 for sensing objects 20 on or in front of outer surface 5b of vehicle window pane 5, may be assigned in this case to second area of coverage 18.

As partially shown, second entrance surface 3c and second exit surface 3d may also be contoured in a lateral direction, for example, orthogonally to the drawing plane, or feature other optical characteristics to thereby additionally achieve desired optical properties, respectively imaging properties in the lateral direction. Thus, for example, second entrance surface 3c may be convexly curved, for example, to capture a greater angular range of the radiation emitted by an object 20, and second exit surface 3d may be chamfered, for example. In principle, however, there is no need for such chamfering, respectively for lateral structural formation.

Thus, entire optical coupling body 3 has upper, flat, first coupling body region 3-1 for forming a first imaging system 21 and downwardly adjoining second coupling body region 3-2 for forming second imaging system 22.

In accordance with the illustrations shown in FIG. 1 through 3, entire optical coupling body 3 may be homogeneously formed from one material, for example, having an optical density, respectively an optical refractive index, which essentially corresponds to that of vehicle window pane 5, or that is also somewhat below that of vehicle window pane 5, i.e., between the air and vehicle window pane 5. Optical coupling body 3 advantageously has a significantly higher refractive index than air, so that the refraction evident from the optical paths of rays of FIG. 3 occurs at the transition from optical coupling body 3 to the air of passenger compartment 15.

The Shore hardness, i.e., the mechanical resistance of coupling body 3 is advantageously selected to allow contact face 3a of coupling body 3 to be adapted to inner surface 5a of vehicle window pane 5, for example, in the case of a slightly convex vehicle window pane 5, making it possible to prevent air inclusions between coupling body 3 and vehicle window pane 5.

First coupling body region 3-1 is also used, in particular, for optically reducing a distance from camera optics 11 to vehicle window pane 5; it is evident here that a passage region, denoted as L1 in FIG. 3, of first sensing region 17 is significantly reduced in size in comparison to an embodiment without first coupling body region 3-1.

Vehicle window pane 5 may be formed with a light shield, for example, using what is known as black tinting as an opaque coating 30, in particular in an upper portion of vehicle window pane 5, near the ceiling. Thus, in opaque coating 30, a first gap 31 essentially having dimensioning L1 (passage region) is provided, as is a second gap 32 for second imaging system 22, i.e., for sensing objects 20 on or in front of outer surface 5b of vehicle window pane 5. As is readily apparent from FIG. 3, gaps 31 and 32 are spaced apart here. Thus, second gap 32 may be provided, in particular, considerably below first gap 31. One region of vehicle window pane 5 may be reached here that is no longer relevant for the optical imaging for sensing vehicular environment 14, i.e., that is disposed in front of the engine hood in order to fulfill the function here of the rain sensor system.

Alternatively to the homogeneous, single-layered construction of coupling body 3, a multilayered construction may also be provided in accordance with FIG. 4, for example. This includes an outer layer 34, in particular of a material having a softer Shore hardness that conforms to the material of coupling body 3 according to the embodiment of FIG. 1 through 3; i.e., in particular of a silicone material. It also includes an inner layer 35, that is inwardly adjoining, i.e., toward passenger compartment 15 that, in particular, may be formed as a rigid layer, for example, of mineral glass or an acrylic glass or other types of transparent materials. Inner layer 35 enhances stability and is used for the uniform pressing of outer layer 34, together with contact face 3a configured thereon, against inner side 5a of vehicle window pane 5.

Layers 34 and 35 may advantageously have the same refractive index; other embodiments having a different refractive index are possible, however. As is readily apparent from FIG. 4, second coupling body region 3-2 may have another region 36 placed on second layer 35, so that second coupling body region 3-2 is thus made up of three layers, i.e., of layers 34 and 35, as well as of region 36. A silicone-containing medium, which has a higher Shore hardness, i.e., mechanical resistance than silicone-containing layer 34, may be selected as material for region 36.

Figure 5:
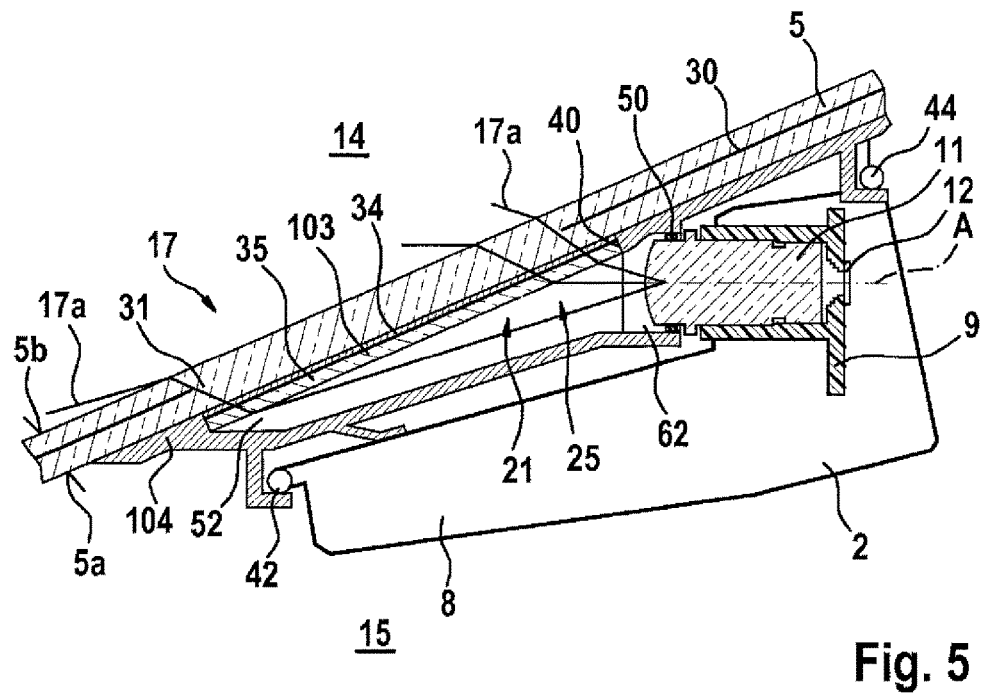
FIG. 5 shows a camera assembly in accordance with another specific embodiment having a biplanar optical coupling body.
Figure 6:
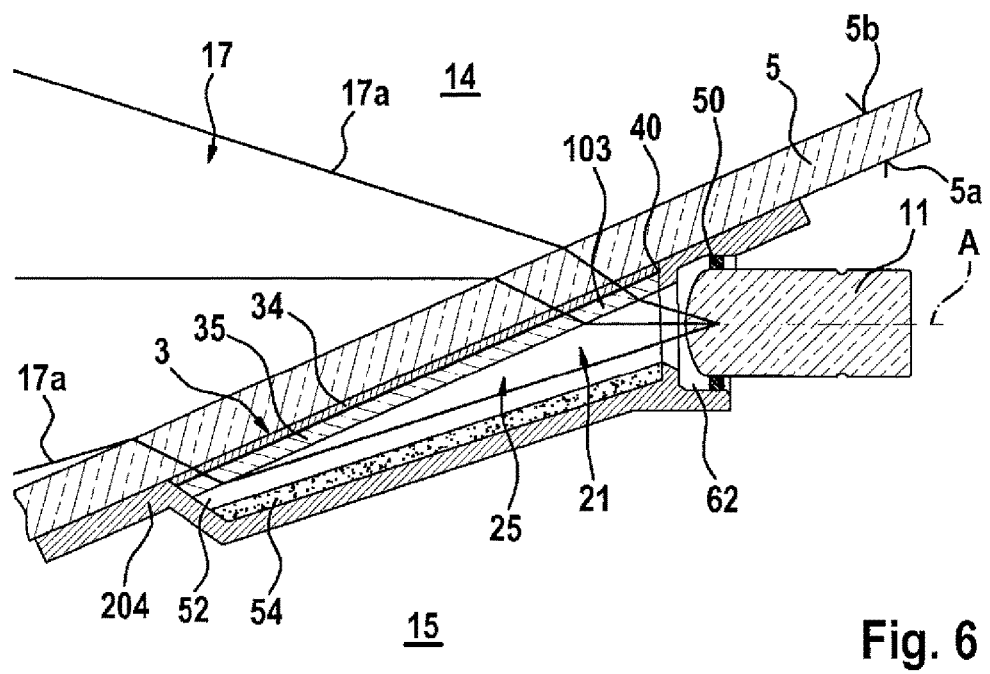
FIG. 6 shows a specific embodiment corresponding to FIG. 5, including additional desiccants.
Figure 7:
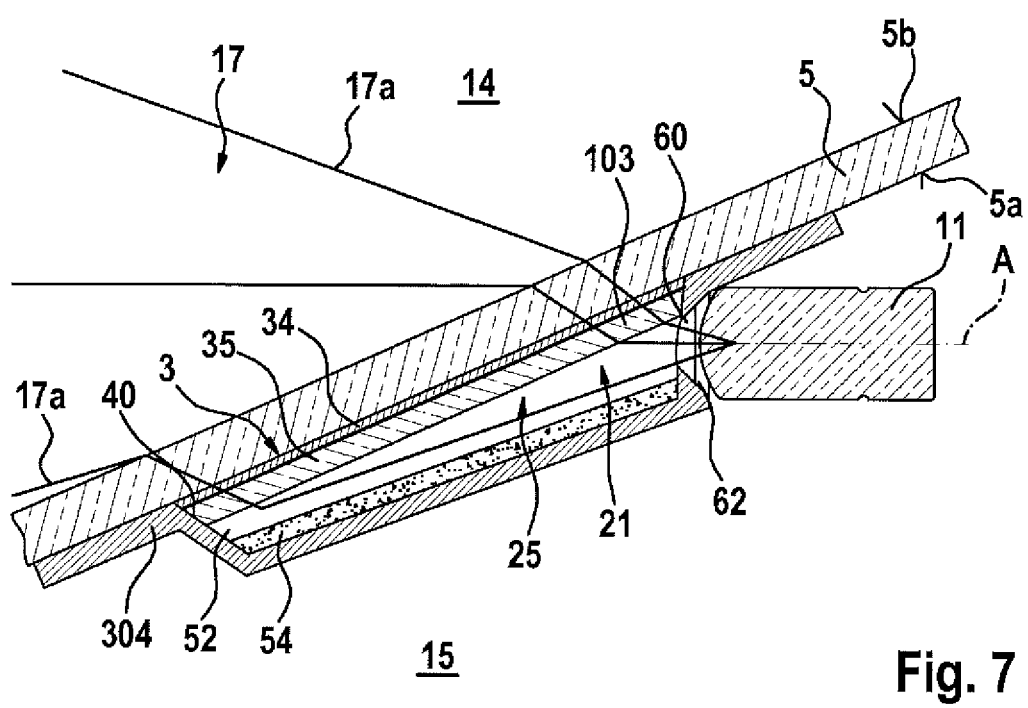
FIG. 7 shows another specific embodiment including an alternative attachment of the camera optics.

FIG. 5 through 7 show another specific embodiment where an optical coupling body 103 having a purely planar, respectively biplanar configuration is shown merely exemplarily, which thus essentially corresponds to first coupling body region 3-1 of the specific embodiment of FIG. 1 through 4. In principle, however, an optical coupling body 3 having coupling body regions 3-1 and 3-2 in accordance with FIG. 1 through 4 may also be provided in the specific embodiments of FIG. 5 through 7; the specific embodiment of FIG. 5 through 7 serves, in particular, for illustrating specific embodiments of different fixing devices 104, 204, 304.

At the same time, optical coupling body 103 may also have a multilayered design, i.e., essentially be formed in accordance with FIG. 4, i.e., only with layers 34 and 35; in principle, however, a single-layered construction is also possible.

FIG. 5 shows a fixing device 104 of plastic material, for example, that is mounted to inner surface 5a of vehicle window pane 5, for example, adhesively bonded thereto. Here, fixing device 104 also serves as a camera mount for receiving entire camera 2. For that purpose, as shown, fixing device 104 may mechanically accommodate camera housing 8 at a plurality of locations, so that camera optics 11 is inserted into a mount 62 on fixing device 104. In particular, mounting supports 42 and 44 may be provided for receiving upper and lower ends of camera housing 8.

Furthermore, fixing device 104 is also used for receiving coupling body 103. For that purpose, fixing device 104 may, in particular, feature an insert 40, which is shaped to conform to optical coupling body 103, allowing it to be placed therein. Upon securing fixing device 104 in position on inner surface 5a of vehicle window pane 5, coupling body 3 is thereby pressed by contact face 3a thereof against inner surface 5a of vehicle window pane 5, preferably without air inclusions forming between vehicle window pane 5 and coupling body 3. For that purpose, insert 40 may, for example, be tapered toward camera optics 11, i.e., away from vehicle window pane 5; a self-centering and securing action of coupling body 103 is thereby made possible upon pressing of fixing device 104 against vehicle window pane 5. Coupling body 103 is thereby "trapped," in particular within fixing device 104 that is fastened in place to vehicle window pane 5; thus, a form-locking engagement is obtained between fixing device 104 and coupling body 103.

In accordance with FIG. 5, a seal 50, for example, a ring seal, is provided in mount 62, between fixing device 104 and camera optics 11 (objective lens). In principle, seal 50 may also rest against carrier device 10; however, the illustrated fitting on camera optics 11 is advantageous. Seal 50 seals an intermediate space 52 between coupling body 103, fixing device 104 and camera optics 11, and advantageously also against passenger compartment 52, thereby preventing any associated dirt from accumulating or, for example, any condensation from forming therein. Intermediate space 52 may communicate with passenger compartment 15, however, via a permeable membrane for pressure compensation, for example.

Thus, fixing device 104 of this specific embodiment is first used for receiving optical coupling body 103; in addition, as a camera mount for accommodating camera 2, and thus also entire camera assembly 1, and for securing camera assembly 1 to vehicle window pane 5, as well as for forming intermediate space 52 to provide protection from dirt accumulation.

In accordance with the specific embodiment of FIG. 6, a fixing device 204 is provided that may essentially have the same design and functionality as fixing device 104 of FIG. 5; a desiccant 54 is additionally added for absorbing any moisture that gets into intermediate space 52.

FIG. 7 shows another specific embodiment that includes a fixing device 304 for sealing camera optics 11 by application of a pressure force. Camera optics 11 may thereby be pressed in the direction of optical axis A thereof, for example, against a soft coupling element 60 that is accommodated in mount 62 of fixing device 304. Soft coupling element 60, respectively mount 62 may thereby be tapered away from camera optics 11, for example, i.e., toward vehicle window pane 5; thus, an action whereby coupling element 60 is self-centered and secured in mount 62 is made possible in this instance by application of a pressure force to camera optics 11.

Thus, a sealing attachment of camera optics 11 by application of a pressure force is achieved here. A desiccant 54 may be additionally provided in this specific embodiment as well.

In the specific embodiments of FIG. 5 through 7, optical coupling body 103 may first be received in insert 40 of particular fixing device 104, 204, 304 to configure camera assembly 1 in vehicle 6, the more rigid inner layer 35, for example, glass, ensuring adequate stability in the case of the illustrated multilayered structure. Fixing device 104, 204, 304, together with optical coupling body 103, is subsequently mounted to inner surface 5a of vehicle window pane 5; and, in accordance with FIG. 5, camera 2 is then attached thereto by insertion thereof into mounting supports 42, 44 or, in accordance with FIG. 7, by the application of a pressure force to coupling element 60.

What is claimed is:

1. A camera assembly for a vehicle, comprising:
a camera having a camera optics and an image sensor;
an optical coupling body including a contact face for engaging on an inner surface of a vehicle window pane, the optical coupling body being formed of an optically transparent material and being configured within an area of coverage by the camera; and
a fixing device provided between the camera and the optical coupling body for positioning the coupling body relative to the camera;

wherein:
the image sensor and the camera optics define an optical axis of the camera;
the optical coupling body includes:
a first biplanar coupling body region for coupling to the contact face and a first exit surface that extends essentially parallel to the contact face; and
a second coupling body region adjoining the first coupling body region;
the optical axis extends through a first entrance surface formed by the contact face for light entering through the vehicle window pane, through the first coupling body region, and through the first exit surface of the optical coupling body;
on the second coupling body region a second entrance surface is configured for light that enters through the vehicle window pane;
a second exit surface is configured for light that emerges from the second coupling body region to produce a second beam path that propagates into the camera optics; and
the second entrance surface does not extend parallel to the contact face and does not extend parallel to the second exit surface.

2. The camera assembly as recited in claim 1, wherein the second coupling body region is prismatically formed, the second entrance surface and the second exit surface extending toward one another in a direction that faces away from the contact face.

3. The camera assembly as recited in claim 1, wherein a second imaging system composed of the camera optics and the second coupling body region has a shorter object-to-lens distance than a first imaging system composed of the camera optics and the first coupling body region.

4. The camera assembly as recited in claim 3, wherein, to image an outer surface of the vehicle window pane or an object, the second imaging system is configured on the outer surface of the vehicle window pane, a beam path of the second imaging system being configured to allow light to pass through the vehicle window pane, to produce a beam path between the vehicle window pane and the coupling body, the second entrance surface, the second exit surface, and the camera optics, onto the image sensor.

5. The camera assembly as recited in claim 1, wherein the optical coupling body having the first coupling body region and the second coupling body region is formed in one piece from a homogeneous material.

6. The camera assembly as recited in claim 5, wherein the homogenous material includes a molded part.

7. The camera assembly as recited in claim 1, wherein the optical coupling body is formed in multilayers, including an outer layer having the contact face of a softer material, and an inner layer of a harder material adjoining the outer layer.

8. The camera assembly as recited in claim 7, wherein the harder material includes one of a glass plate and an acrylic glass.

9. The camera assembly as recited in claim 1, wherein the fixing device receives the optical coupling body, form-fittingly, the contact face being provided for adhesive-free engagement on the inner surface of the vehicle window pane.

10. The camera assembly as recited in claim 1, wherein the fixing device is configured as a camera mount for mechanically receiving the camera.

11. The camera assembly as recited in claim 1, further comprising a desiccant configured in or on the fixing device for drying an intermediate space between the fixing device and the coupling body.

12. The camera assembly as recited in claim 1, wherein the fixing device has a mount for one of placing and inserting the camera optics therein, a seal being provided for sealing an intermediate space in the fixing device.

13. The camera assembly as recited in claim 12, further comprising:
   a soft coupling element accommodated as a seal in the mount of the fixing device, the camera optics being pressed along the optical axis against the soft coupling element.

14. A vehicle, comprising:
   a vehicle window pane; and
   a camera assembly provided in the passenger compartment and including:
      a camera having a camera optics and an image sensor,
      an optical coupling body including a contact face for engaging on an inner surface of a vehicle window pane, the optical coupling body being formed of an optically transparent material and being configured within an area of coverage by the camera, and
      a fixing device provided between the camera and the optical coupling body for positioning the coupling body relative to the camera, wherein:
      the optical coupling body one of engaging on and being pressed against an inner surface of the vehicle window pane, and
      a vehicular environment is able to be imaged onto the image sensor through the camera optics and the optical coupling body;
   wherein:
      the coupling body includes a first coupling body region and a second coupling body region that adjoins the first coupling body region;
      the camera optics and the first coupling body region compose a first imaging system for imaging a vehicular environment onto the image sensor at a first object-to-lens distance;
      the camera optics and the second coupling body region compose a second imaging system for imaging a window pane environment on an outer surface of the vehicle window pane or an object adhering to the outer surface onto the image sensor;
      the second imaging system produce a beam path through the vehicle window pane for light to exit from the inner surface of the vehicle window pane, thereby forming a beam path from the vehicle window pane to a second entrance surface of the second coupling body region, through the second coupling body region to a second exit surface and to the camera optics, onto the image sensor; and
      the second entrance surface does not extend parallel to the contact face and does not extend parallel to the second exit surface.

15. The vehicle as recited in claim 14, wherein the vehicle window pane includes a windshield for separating a vehicle environment from a passenger compartment.

16. The vehicle as recited in claim 14, wherein the fixing device is provided for mounting to the inner surface of the vehicle window pane for engaging or pressing of the optical coupling body on or against the inner surface of the vehicle window pane.

17. The vehicle as recited in claim 16, wherein the fixing device is mounted to the inner surface of the vehicle window pane by adhesion.

* * * * *